United States Patent Office 2,960,538
Patented Nov. 15, 1960

2,960,538

NEW ALKYL DITHIOL AND ALKENYL THIOL

Paul D. May, Galveston, and Robert J. Lee, La Marque, Tex., assignors to The American Oil Company, Texas City, Tex., a corporation of Texas No Drawing. Filed Mar. 30, 1959, Ser. No. 802,606

3 Claims. (Cl. 260—609)

Our invention relates to certain mercaptans as new compositions of matter. More particularly, it relates to a new alkyl dithiol and a new alkenyl thiol.

We have discovered that two new mercaptans, 2,5-dimethyl-2-hexene-4-thiol and 2,5-dimethyl-3,4-hexanedithiol are formed by the reaction of 2,5-dimethyl-2,4-hexadiene with an excess of hydrogen sulfide in the presence of water, an organic peroxide or other free-radical initiator, and either elemental iron, cobalt, or nickel, according to the following reaction scheme.

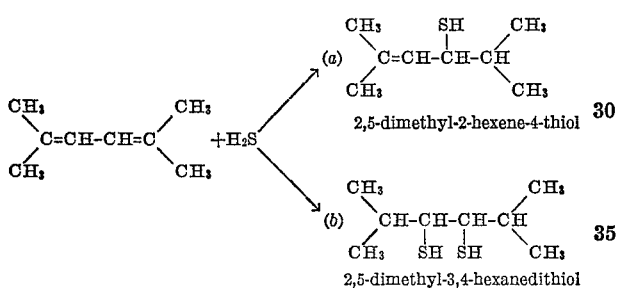

The new mercaptans, particularly the alkyl dithiol, are especially valuable as chain transfer agents or modifiers in the preparation of synthetic rubber, and as oxidation stabilizers for polyethylene or other olefin polymers. Both compounds are pleasant-smelling liquids.

In preparing the new mercaptans, 2,5-dimethyl-2,4-hexadiene is reacted with a molar excess of hydrogen sulfide in the presence of water, a free radical initiator such as the organic di-tert-butyl peroxide, and iron, cobalt or nickel. The peroxide and the metal may each be employed in a concentration ranging from about 0.001% to about 10% or more on olefin; other free radical initiators such as ultra-violet light or α,α'-azodi-iso-butyronitrile may be substituted for the organic peroxide. The reaction is advantageously carried out at elevated temperature and pressure, desirably a temperature within the range of about 200 to about 500° F. and a pressure of from about 500 to about 2,000 p.s.i.g. The reaction time appears to depend upon the temperature, pressure, and activity of the free-radical initiator, but ordinarily is between about one and about twenty hours or more.

We have found that the new mercaptans may be employed as chain transfer agents or modifiers in the preparation of synthetic rubbers by polymerizing the olefinic monomer precursors thereof. In an illustrative embodiment, the copolymerization of 71.5 parts by weight of butadiene, and 28.5 parts of styrene may be effected in the presence of 180 parts water, 4.68 parts of Dresinate emulsifier (Hercules Powder Company, rosin soap), 0.30 part potassium persulfate and about 0.05–0.8 parts of either 2,5-dimethyl-2-hexene-4-thiol, 2,5-dimethyl-3,4-hexenedithiol, or a mixture of both. The copolymerization reaction is carried out for about fifteen hours at 50° C., to obtain about 72% conversion to a rubbery copolymer having a Mooney rubber viscosity of about 55.

The following example illustrates the preparation and characterization of the new mercaptans.

*Example*

A mixture of 320 grams hydrogen sulfide, 200 grams of 2,5-dimethyl-2,4-hexadiene (USI grade), 50 grams water, and 3 grams di-tert-butyl peroxide, was charged to a carbon steel reactor containing 12 grams steel wool and reacted at 250° F. and 1,000 p.s.i.g. At the end of twelve hours at these conditions, the products were separated and consisted of an aqueous layer and a non-aqueous liquid layer. The latter was distilled at 10 millimeters' mercury absolute through a 15-plate column to obtain 45.7 grams of a cut boiling at 54–57° C. (10 mm.) which was 2,5-dimethyl-2-hexene-4-thiol, and 49.7 grams of a cut boiling at 101–103° C. (10 mm.) which was 2,5-dimethyl-3,4-hexane-dithiol.

The 2,5-dimethyl-2-hexene-4-thiol was characterized as follows:

Product:
- Boiling point _____ 54–57° C. (10 mm. Hg).
- Sulfur percent _____ 21.8 (calculated 22.2).
- Mol weight (cryoscopic) _____ 144 (calculated 144).
- Mass No. (by mass spectrometer) _____ 144 (calculated 144).
- Color _____ Water-white.
- $D_4^{25}$ _____ 0.857.
- $n_D^{25}$ _____ 1.4689.

The 2,5-dimethyl-3,4-hexanedithiol was characterized as follows:

Product:
- Boiling point _____ 101–103° C. (10 mm. Hg).
- Sulfur, percent _____ 34.9% (calculated 36.0).
- Mol weight (cryoscopic) _____ 170 (calculated 178).
- Mass No. (by mass spectrometer) _____ 178 (calculated 178), also contains some 144 material.
- Color _____ Yellow.
- $D_4^{25}$ _____ 0.956.
- $n_D^{25}$ _____ 1.4980.

Both of the new mercaptan compounds may be incorporated into stereospecific homopolymers and copolymers of 1-alkenes and/or dienes, such as polyethylene, polypropylene, and poly-cis-butadiene, etc., especially when the polymers contain a minor amount of carbon black as an ultra-violet light stabilizing agent. Also, because of its reactive olefin function, the 2,5-dimethyl-2-hexene-4-thiol may be chlorinated to a useful insecticide and herbicide.

Mercaptans of the above general type may be prepared according to the process described in F. A. Ford application S.N. 802,649, filed March 30, 1959.

We claim:

1. As a new composition of matter, at least one member selected from the group consisting of 2,5-dimethyl-2-hexene-4-thiol and 2,5-dimethyl-3,4-hexanedithiol.

2. As a new composition of matter, 2,5-dimethyl-2-hexene-4-thiol.

3. As a new composition of matter, 2,5-dimethyl-3,4-hexane-dithiol.

No references cited.